(12) United States Patent
Takahashi (10) Patent No.: US 7,787,993 B2
(45) Date of Patent: Aug. 31, 2010

(54) ROBOT HAND AND ROBOT (75) Inventor: Kazuyuki Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 486 days.

(21) Appl. No.: 11/928,603

(22) Filed: Oct. 30, 2007

(65) Prior Publication Data

US 2008/0114491 A1 May 15, 2008

(30) Foreign Application Priority Data

Nov. 9, 2006 (JP) .............................. 2006-303946

(51) Int. Cl.
*B25J 15/10* (2006.01)
*B25J 15/08* (2006.01)

(52) U.S. Cl. ..................... 700/262; 700/253; 700/261; 318/568.21; 901/31; 901/33; 901/39

(58) Field of Classification Search ................. 700/250, 700/254, 260, 262; 901/9, 33, 34, 38; 623/64, 623/65
See application file for complete search history.

(56) References Cited

U.S. PATENT DOCUMENTS

| 4,980,626 | A * | 12/1990 | Hess et al. | 318/568.16 |
| 5,373,747 | A * | 12/1994 | Ogawa et al. | 73/862.581 |
| 6,016,385 | A * | 1/2000 | Yee et al. | 700/245 |
| 2006/0014098 | A1 * | 1/2006 | Hada et al. | 430/270.1 |
| 2007/0018470 | A1 * | 1/2007 | Hayakawa et al. | 294/106 |
| 2007/0236162 | A1 * | 10/2007 | Kawabuchi et al. | 318/568.16 |
| 2008/0077361 | A1 * | 3/2008 | Boyd et al. | 702/189 |
| 2009/0031825 | A1 * | 2/2009 | Kishida et al. | 73/862.621 |

FOREIGN PATENT DOCUMENTS

JP 2005-349491 12/2005

OTHER PUBLICATIONS

Y.C. Park & G.P. Starr, "Finger Force Computation for Manipulation of an Object by a Multifingered Robot Hand", IEEE Int. Conf on Tobotucs and Automation, May 1989, pp. 930-935.*
H. Nakamoto, F. Kobayashi, N. Imamura & H. Shirasawa, "Universal Robot Hand Equipped with Tactile and Joint Torque Sensors—Developments and Experiments on Stiffness Control and Object Recognition" From Systemics, Cybernetics & Informatics, V5, No. 2 pp. 79-84.*

(Continued)

*Primary Examiner*—Thomas G Black
*Assistant Examiner*—Lin B Olsen
(74) *Attorney, Agent, or Firm*—Rankin, Hill & Clark LLP (57) ABSTRACT

A robot hand able to change the manner of holding an object while force applied from a plurality of finger mechanisms to the object is adjusted without using an auxiliary finger mechanism. When force $F_3$ is applied to object w from a certain finger mechanism 13 among the plurality of finger mechanisms 11 to 13 is changed, the operation of each finger mechanism is controlled such that a "contact" of each of the finger mechanisms 11 to 13 in the object w and an "application force vector" from each of the finger mechanisms 11 to 13 to the object w satisfy a "stable gripping condition". The "stable gripping condition" is a condition in which (1) the sum of each of forces and moments applied from the plurality of finger mechanisms 11 to 13 to the object w becomes zero, and (2) a slip index fr becomes minimum.

4 Claims, 6 Drawing Sheets

OTHER PUBLICATIONS

K.P. Kleinmann, J.O. Hennig, C. Ruhm & H. Yolle, "Object Manipulation by a Multifingered Gripper: On the transition from Precision ro Power GRasp", Proc. 1996 IEEE Int. Conf. on Robotics and Automation, Apr. 1996, pp. 2761-2766.*

E. Toth, "Stable Object Grasping with Dextrous Hand in Three-Dimension" Periodic Polytechnica Ser. El., Eng. C 43, No. 3, pp. 207-214, 1999.*

A.T. Miller & P.k. Allen, "Examples of 3D Grasp Quality Computations", Proc. 1999 IEEE Int. Com. on Robotics and Automation, May 1999, pp. 1240-1246.*

A.M. Okamura, N. Smaby & M.R. Cutkosky, "An Overview of Dextrous Manipulation", Proc. 2000 IEEE Int. Com. on Robotics and Automation, Apr. 2000, pp. 255-262.*

A. Bicchi & V. Kumar, "Robotic Grasping and Contact: A Review" Proc. 2000 IEEE Int. Com. on Robotics and Automation, Apr. 2000, pp. 348-353.*

Y. Le & I Kao, "A Review of Modeling of Soft-Contact Fingers and Stiffness Control for Dextrous Manipulation in Robotics", Proc. 2001 IEEE Int. Com. on Robotics and Automation, May 2001, pp. 3055-3060.*

NASA Tech Brief: "Three-fingered Robot Hand with Self-adjusting Grip", Dec. 2001, Retrieved Mar. 27, 2010.*

Shadow Robot Company, Commercial HAnd—Product Summary, Created May 29, 2002, updated Jan. 17, 2005, Retrieved Feb. 10, 2005.*

E.A. Al-Gallaf, "Multi-fingered Robot Hand Optimal Task Force Distribution Neural Inverse Kinematics Approach", Robotics and Autonomous Systems, S4, (2006) pp. 34-51.*

* cited by examiner

ROBOT HAND AND ROBOT

FIELD OF THE INVENTION

The present invention relates to a robot hand having a base portion, a plurality of finger mechanisms extended from the base portion and able to be bent and stretched, a driving section for operating each finger mechanism, and a control section for controlling the operation of each of the plurality of finger mechanisms, and a legged mobile robot having the robot hand.

BACKGROUND ART

A robot hand having a function for changing the manner of holding an object as well as gripping of the object is proposed (see paragraph 0039 and FIG. 5 of Japanese Patent Laid-Open No. 2005-349491). In accordance with this robot hand, when the object is gripped by a plurality of rotation finger mechanisms, the changing of the manner of holding the object is assisted by assisting a posture change of the object by an auxiliary finger mechanism.

However, when the changing of the manner of holding the object is intended by separating a certain finger mechanism among the plurality of finger mechanisms from the object without using the auxiliary finger mechanism, there is a possibility that force applied to the object from the plurality of finger mechanisms becomes unbalanced. Therefore, there is a possibility that the posture of the object with respect to the robot hand is greatly changed and the finger mechanism is slipped with respect to the object so that it results in unsuccessful changing of the manner of holding the object using the robot hand.

SUMMARY OF THE INVENTION

Therefore, a purpose of the present invention is to provide a robot hand able to change the manner of holding the object while force applied from the plurality of finger mechanisms to the object is adjusted without using the auxiliary finger mechanism, and a robot having the robot hand.

Therefore, the robot hand of a first invention comprises a base portion; a plurality of finger mechanisms extended from the base portion and able to be bent and stretched; a first measuring section for measuring a contact point with each finger mechanism on an object; a second measuring section for measuring a force vector applied from each finger mechanism to the object; and a control section for controlling an operation of each finger mechanism on the basis of a measuring result of each of the first measuring section and the second measuring section. The control section controls the operation of each finger mechanism such that the contact point with each finger mechanism on the object measured by the first measuring section and the force vector applied to the object from each finger mechanism measured by the second measuring section satisfy a stable gripping condition in a process for changing the force vector applied to the object from at least one of certain finger mechanisms among the plurality of finger mechanisms. The stable gripping condition is a condition in which the sum of each of forces and moments applied from the plurality of finger mechanisms to the object becomes zero, and a slip index becomes minimum as a decreasing function of the magnitude of an inner product of a vector perpendicular to an axis of a frictional cone of the object with respect to each finger mechanism and an application force vector from each finger mechanism to the object.

In accordance with the robot hand of the first invention, when the force applied to the object from the certain finger mechanism among the plurality of finger mechanisms is changed, the operation of each finger mechanism is controlled such that the "contact" of each finger mechanism in the object and the "application force vector" from each finger mechanism to the object satisfy the "stable gripping condition". The "stable gripping condition" is a condition in which (1) the sum of each of forces and moments applied from the plurality of finger mechanisms to the object becomes zero and (2) the slip index becomes minimum. The "slip index" is defined as a decreasing function of the magnitude of an inner product of a vector perpendicular to the axis of a frictional cone of the object with respect to each finger mechanism, and an application force vector from each finger mechanism to the object. Since the condition that the forces and moments applied from the plurality of finger mechanisms to the object become zero is satisfied, the situation of greatly changing the position and posture of the object with respect to the robot hand is avoided. Further, the situation of slipping the finger mechanisms with respect to the object is avoided or restrained by satisfying the condition of minimizing the slip index.

Accordingly, in a process in which force applied to the object from a certain finger mechanism among the plurality of finger mechanisms is gradually weakened and becomes zero and the certain finger mechanism is separated from the object, a balance of the forces applied from the plurality of finger mechanisms to the object can be appropriately adjusted from the view point of object gripping. Further, in a process in which the finger mechanism separated from the object is again abutted on the object and the force applied from this finger mechanism to the object is gradually strengthened, the balance of the forces applied from the plurality of finger mechanisms to the object can be appropriately adjusted from the view point of the object gripping. The changing of the manner of holding the object involving the above separation of the certain finger mechanism from the object and the reabutting onto the object can be smoothly executed.

The robot hand of a second invention according to the first invention further comprises a first finger mechanism, and second and third finger mechanisms abutting on the object oppositely to the first finger mechanism as the plurality of finger mechanisms, contacts on the object of each of the first, second and third finger mechanisms being defined as a first contact, a second contact and a third contact, respectively. The control section controls the operation of each finger mechanism such that a ratio of the force applied to the object from each of the first, second and third finger mechanisms with respect to a direction perpendicular to a line segment connecting the second and third contacts in a plane including the first, second and third contacts in the process for changing the force vector applied from the third finger mechanism to the object is represented as $-1:\alpha:1-\alpha (0 \leq \alpha < 1)$ by using a coefficient $\alpha$ determined so as to satisfy the stable gripping condition.

In accordance with the robot hand of the second invention, when the force applied from the third finger mechanism to the object is changed in a state in which the object is gripped by three finger mechanisms, i.e., the first finger mechanism and the second and third finger mechanisms opposed to the first finger mechanism, the magnitude and direction of the force applied to the object from the first and second finger mechanisms are adjusted in consideration of the slip index reflecting arrangements of the first, second and third contacts and the like. Thus, the changing of the manner of holding the object involving the separation of the third finger mechanism among the three finger mechanisms from the object and the reabutting onto the object can be smoothly executed.

Further, the robot hand of a third invention according to the first invention is characterized in that the control section controls the operation of each finger mechanism such that the force applied to the object from at least one finger mechanism except for the certain finger mechanism, in which the force of this certain finger mechanism applied to the object is weakened, among the plurality of finger mechanisms reaches an upper limit value.

In accordance with the robot hand of the third invention, force applied to the object from at least a certain finger mechanism among the finger mechanisms continuously abutting on the object in changing the manner of holding the object is adjusted to its upper limit value. Thus, frictional force of this finger mechanism and the object is strengthened and it can be prevented or restrained that the finger mechanism is slipped with respect to the object.

The robot of a fourth invention is a legged mobile robot comprising a base body; a plurality of leg bodies extended from the base body; an arm extended from an upper portion of the base body; a robot hand attached to a tip of the arm; and a control section for controlling a gripping operation of an object using the robot hand and operations of the plurality of leg bodies. The robot hand comprising a base portion; a plurality of finger mechanisms extended from the base portion and able to be bent and stretched; a first measuring section for measuring a contact point with each finger mechanism on the object; and a second measuring section for measuring a force vector applied from each finger mechanism to the object. The control section controls the operation of each finger mechanism such that the contact point with each finger mechanism on the object measured by the first measuring section and the force vector applied to the object from each finger mechanism measured by the second measuring section satisfy a stable gripping condition in a process for changing the force vector applied to the object from at least one of certain finger mechanisms among the plurality of finger mechanisms. The stable gripping condition is a condition in which the sum of each of forces and moments applied from the plurality of finger mechanisms to the object becomes zero, and a slip index becomes minimum as a decreasing function of the magnitude of an inner product of a vector perpendicular to an axis of a frictional cone of the object with respect to each finger mechanism and an application force vector from each finger mechanism to the object.

In accordance with the robot of the fourth invention, when force applied to the object from the certain finger mechanism among the plurality of finger mechanisms is changed, the operation of each finger mechanism is controlled such that the "contact" of each finger mechanism in the object and the "application force vector" from each finger mechanism to the object satisfy the "stable gripping condition". Thus, a slip of the finger mechanism with respect to the object and unbalance of the posture of the object with respect to the robot hand are prevented. Further, the changing of the manner of holding the object involving the separation of the certain finger mechanism from the object and the reabutting onto the object can be smoothly executed.

DESCRIPTION OF THE PREFERRED EMBODIMENTS

Embodiments of a robot hand and a robot of the present invention will be explained by using the drawings.

Figure 1:
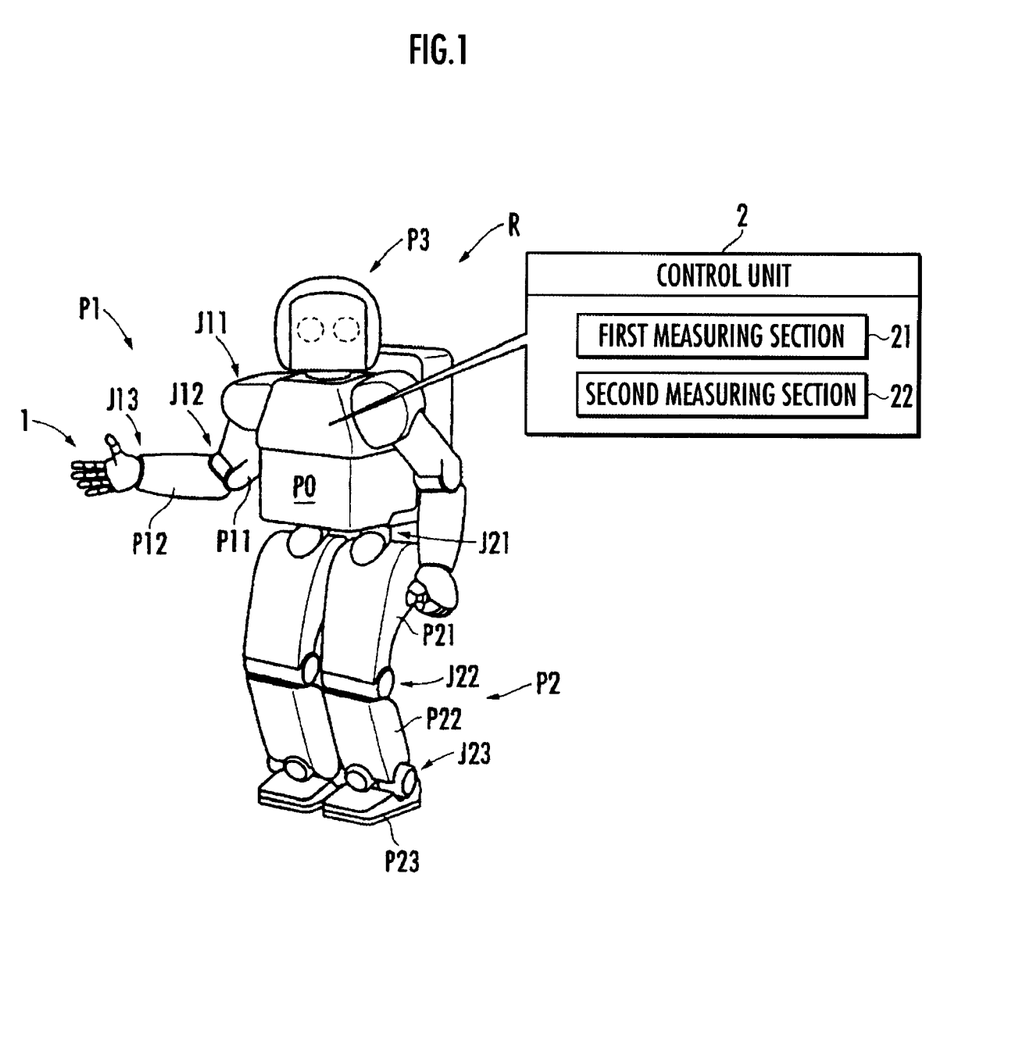
FIG. 1 is a view illustrating the construction of a robot having a robot hand of the present invention.

The robot R shown in FIG. 1 is a legged mobile robot. Similar to a human being, the robot R has a body P0, left and right arm portions P1 extended from both upper portion sides of the body P0, a hand (robot hand) 1 arranged at a tip of each of the left and right arm portions P1, left and right legs P2 extended downward from a lower portion of the body P0, a head P3 arranged above the body P0, and a control unit 2 constructed by a memory such as a CPU, a ROM, a RAM or the like, a signal inputting circuit, a signal outputting circuit or the like, and controlling the operation of the robot R. An imaging device such as a CCD camera or the like for picking-up an image of the circumference of the robot R may be also mounted to the head P3.

The body P0 is constructed by an upper portion and a lower portion vertically connected so as to be relatively rotated around a yaw axis.

The arm portion P1 has a first arm link P11 and a second arm link P12. The body P0 and the first arm link P11 are connected through a shoulder joint J11. The first arm link P11 and the second arm link P12 are connected through an elbow joint J12. The second arm link P12 and the hand 1 are connected through a carpal joint J13. The shoulder joint J11 has rotation degrees of freedom around roll, pitch and yaw axes. The elbow joint J12 has a rotation degree of freedom around the pitch axis. The carpal joint J13 has rotation degrees of freedom around the roll, pitch and yaw axes.

The leg P2 has a first leg link P21, a second leg link P22 and a foot portion P23. The body P0 and the first leg link P21 are connected through a hip joint J21. The first leg link P21 and the second leg link P22 are connected through a knee joint J22. The second leg link P22 and the foot portion P23 are connected through a foot joint J23. The hip joint J21 has rotation degrees of freedom around the roll, pitch and roll axes. The knee joint J22 has a rotation degree of freedom around the pitch axis. The foot joint J23 has rotation degrees of freedom around the roll and pitch axes.

The head P3 can variously move as in rotation or the like around the yaw axis with respect to the body P0.

Figure 2:
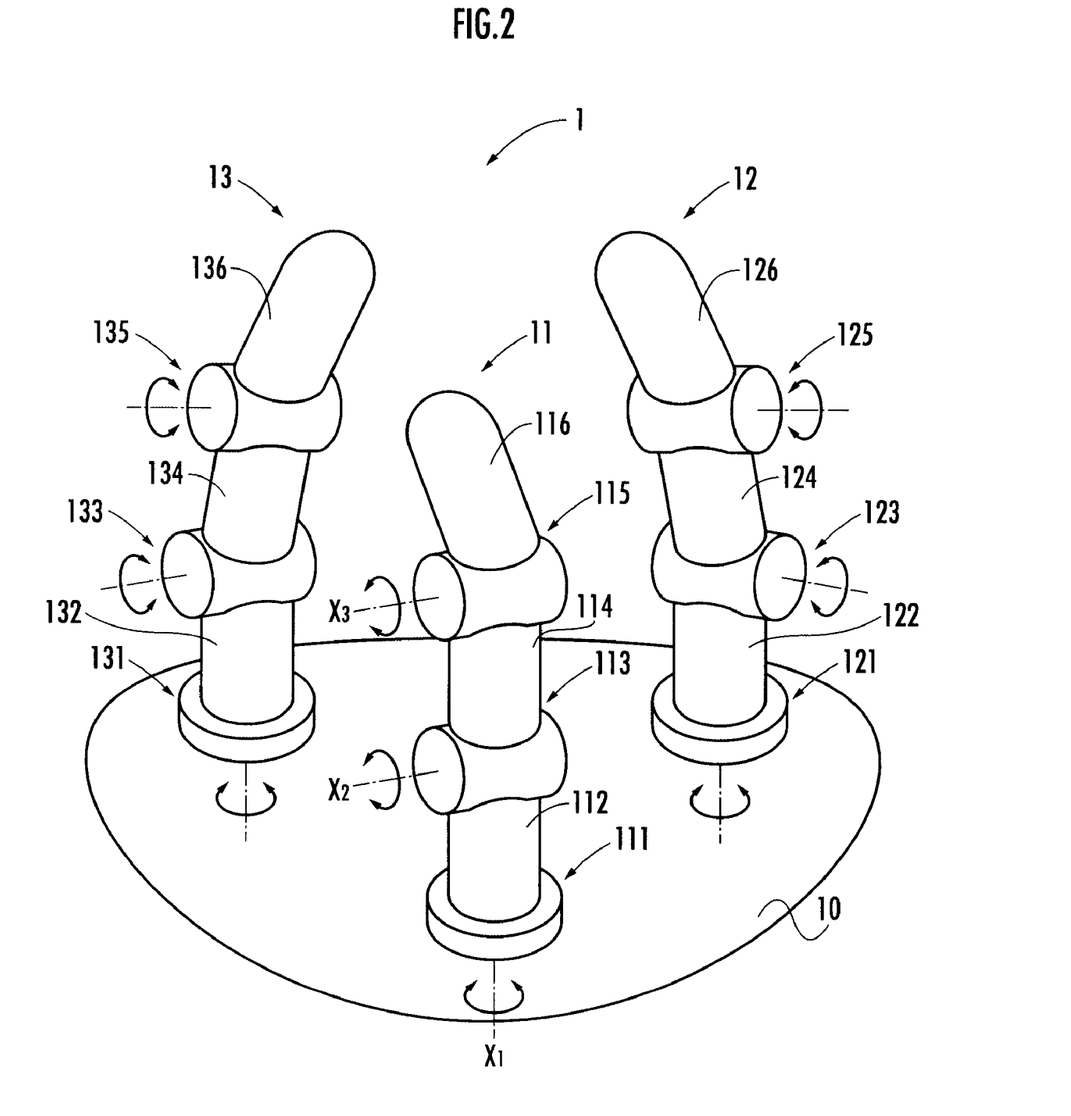
FIG. 2 is a view illustrating the construction of the hand.

As shown in FIG. 2, the hand 1 has a palm portion 10, and a first finger mechanism 11, a second finger mechanism 12 and a third finger mechanism 13 extended from the palm portion 10. For example, similar to a finger mechanism described in Japanese Patent Laid-Open No. 2001-347482, each of the finger mechanisms 11 to 13 can be separately independently bent and stretched, and is respectively similarly constructed. For example, the first finger mechanism 11 has a first link member 112, a second link member 114 and a third link member 116. The first finger mechanism 11 may be also covered with an unillustrated elastic cover. The first link member 112, the second link member 114 and the third link member 116 respectively correspond to a proximal knuckle, a middle knuckle and a distal knuckle of an index finger, a middle finger, or the like of a hand of a human being. The first link member 112 is connected to the palm portion 10 through a first joint 111 in a state able to be rotated around a first axis x1 with respect to the palm portion 10. The second link member 114 is connected to the first link member 112 through a second joint 113 in a state able to be rotated around a second axis x2 perpendicular to the first axis x1 with respect to the first link member 112. The third link member 116 is connected to the second link member 114 through a third joint 115 in a state able to be rotated around a third axis x3 parallel to the second axis x2 with respect to the second link member 114. The first joint 111, the second joint 113 and the third joint 115 respectively correspond to a metacarpophalangeal joint, a proximal interphalangeal joint and a distal interphalangeal joint of the index finger and the middle finger of the hand of the human being.

The first finger mechanism 11 can rotate with respect to the palm portion 110 in the first joint 111 by power of a motor arranged in the first joint 111. Further, the first finger mechanism 11 can be bent in each of the second joint 113 and the third joint 115 by power of a motor arranged in each of the second joint 113 and the third joint 115. The operation of each motor is controlled by the control unit 2. The operation of the first finger mechanism 11 is controlled by force respectively transmitted from the motor to each of the first link member 112, the second link member 114 and the third link member 116 through a force transmitting mechanism. The force transmitting mechanism may be also constructed by a wire, a pulley or the like as described in the above publication, and all constructions able to transmit the power of the motor so as to bend and stretch each finger mechanism may be also adopted.

The construction of each of the second finger mechanism 12 and the third finger mechanism 13 is approximately similar to the above construction of the first finger mechanism 11, and its explanation is therefore omitted.

The control unit 2 has a first measuring section 21 and a second measuring section 22.

The first measuring section 21 measures respective contacts of the finger mechanisms 11 to 13 in an object (work) w on the basis of the outputs of an unillustrated six-axis force sensor arranged in a finger tip portion of each of the finger mechanisms 11 to 13 and a contact sensor arranged in a finger pulp portion. Similarly, the second measuring section 22 measures a force vector applied to the object w from each of the finger mechanisms 11 to 13 on the basis of the outputs from the six-axis force sensor or the like. In a process for changing the force vector applied from at least a certain finger mechanism among the plurality of finger mechanisms 11 to 13 to the object w, the control unit 2 controls the operations of the finger mechanisms 11 to 13 on the basis of respective measuring results of the first measuring section 21 and the second measuring section 22.

Figure 3:
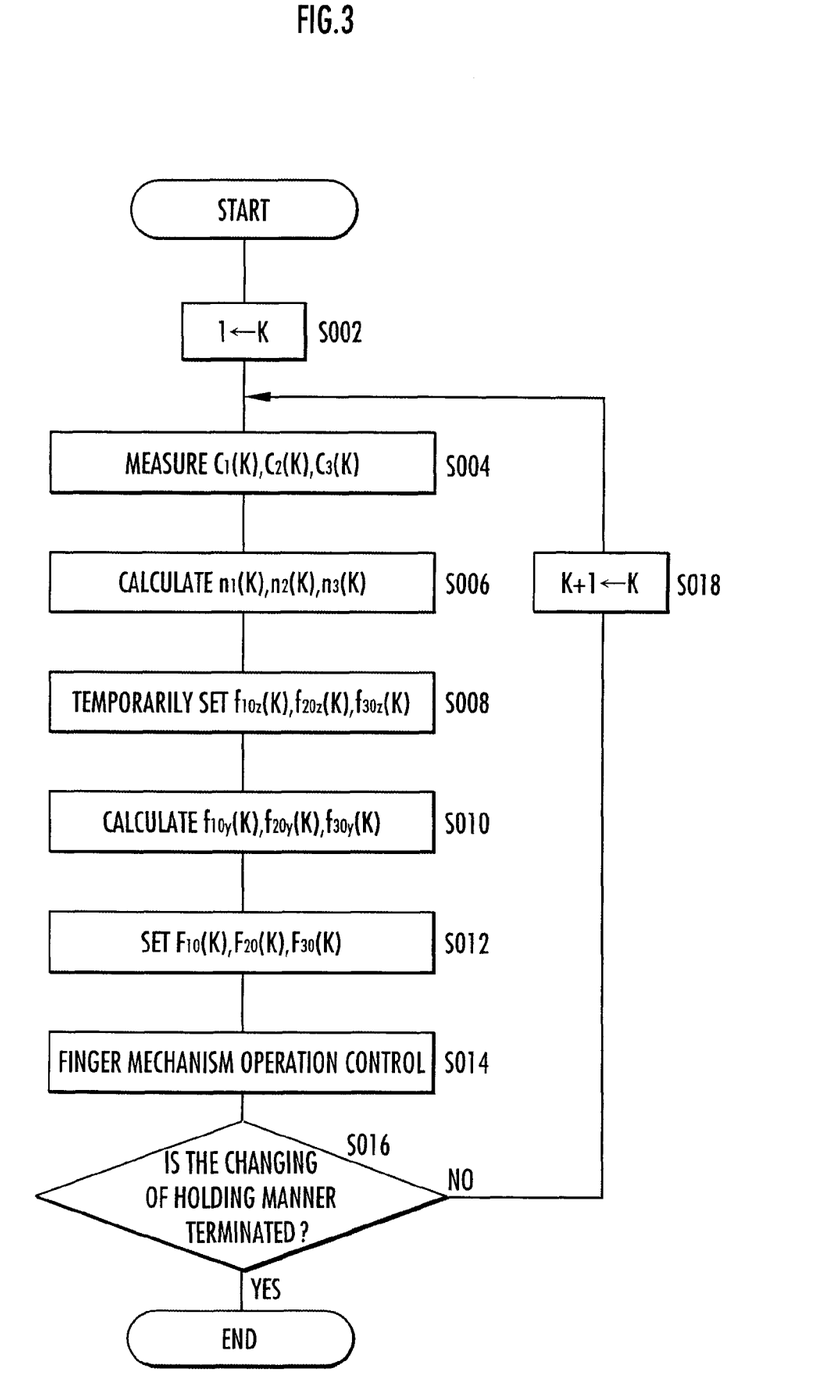
FIG. 3 is a view illustrating a function of the robot hand of the present invention.
Figure 4:
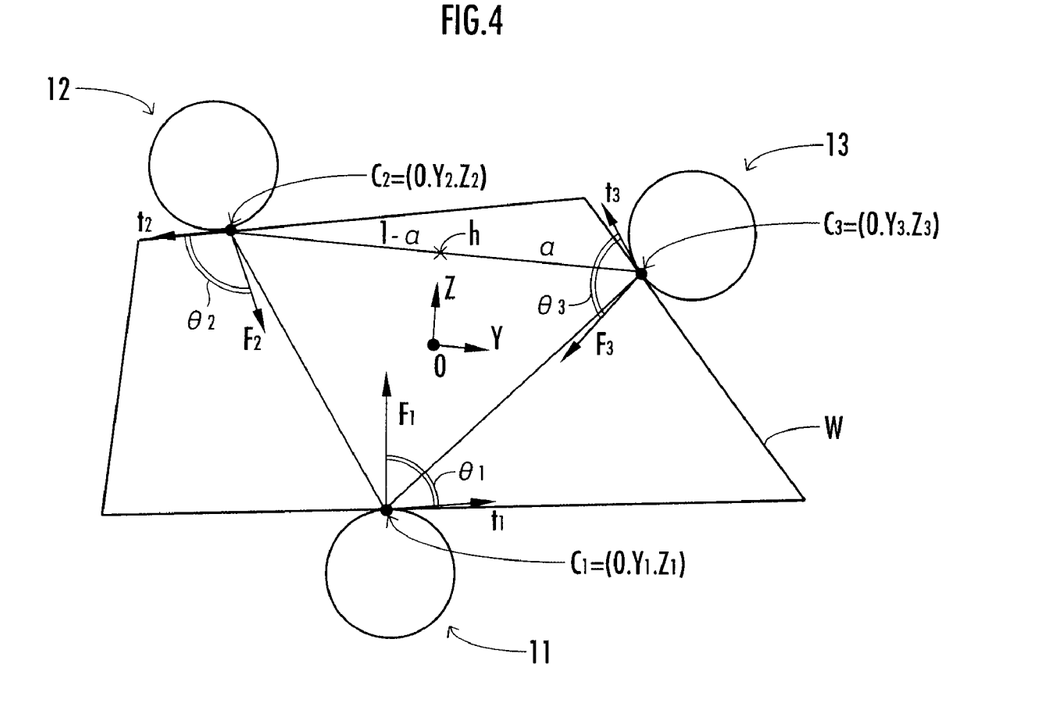
FIG. 4 is a view illustrating the function of the robot hand of the present invention.
Figure 5:
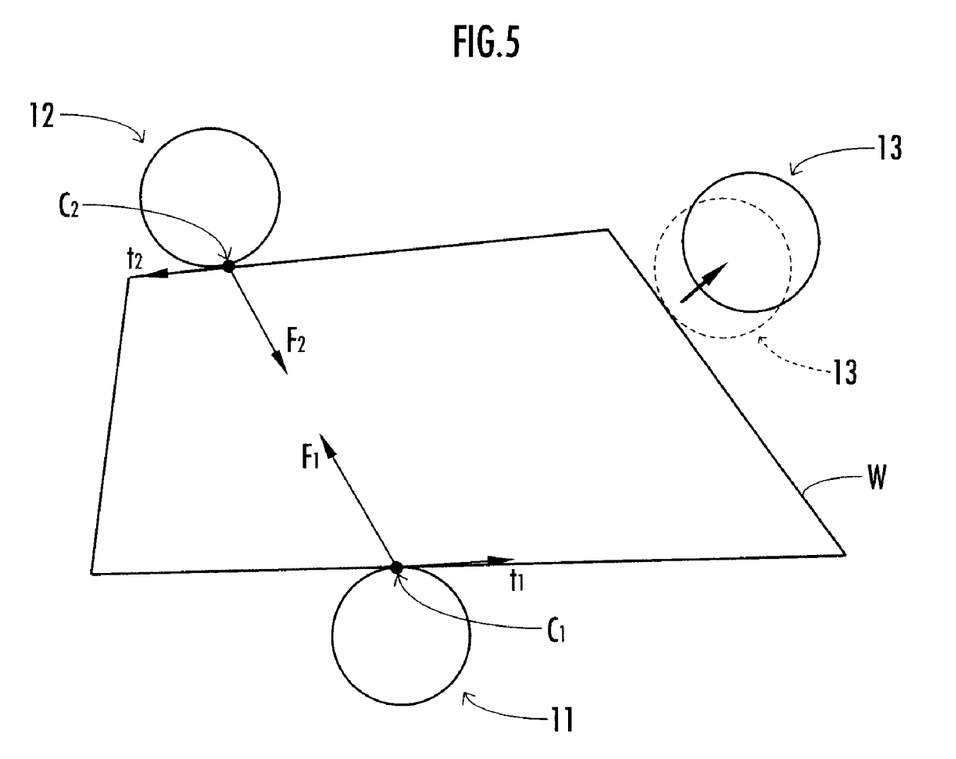
FIG. 5 is a view illustrating the function of the robot hand of the present invention.

In accordance with the robot hand 1 of the above construction, as shown in FIG. 4, when the object w of a flat plate shape is gripped by the first finger mechanism 11, the second finger mechanism 12 and the third finger mechanism 13, the manner of holding the object w is changed by separating the third finger mechanism 13 from the object w. For example, it is necessary to change the manner of holding the object w in a state in which an intermediate portion (a portion of the second link member) of the third finger mechanism 13 is abutted on the object w although it is desired that a tip portion (a portion of the third link member) of the third finger mechanism 13 is abutted. A procedure of the change of the manner of holding the object w using the robot hand 1 will be explained by using FIGS. 3 to 6.

A plane including a triangle having a first contact $c_1$, a second contact $c_2$ and a third contact $c_3$ set to contacts of each finger mechanism in the object w as vertices is defined as a gripping plane to control the respective operations of the first finger mechanism 11, the second finger mechanism 12 and the third finger mechanism 13. Further, it is defined that the center of the triangle is an origin of the gripping plane, and the normal direction of the gripping plane is an x-direction, and a direction parallel to a line segment connecting the second contact $c_2$ and the third contact $c_3$ in the plane is a y-direction, and a direction perpendicular to the line segment in the gripping plane is a z-direction.

First, an index k showing a control cycle is set to 1, and the control unit 2 calculates first contact $c_1(k)={}^t(c_{1y}(k),c_{1z}(k))$, second contact $c_2(k)={}^t(c_{2y}(k),c_{2z}(k))$ and third contact $c_3(k)={}^t(c_{3y}(k),c_{3z}(k))$ of each of the finger mechanisms 11 to 13 in the object w on the basis of the outputs of the six-axis force sensor and the like arranged in each of the finger mechanisms 11 to 13 (index "t" represents transposition, and hereinafter shows the same) (FIG. 3/S004). Further, the control unit 2 similarly calculates vectors $t_1(k)={}^t(t_{1y}(k),t_{1z}(k))$, $t_2(k)={}^t(t_{2y}(k),t_{2z}(k))$ and $t_3(k)={}^t(t_{3y}(k),c_{3z}(k))$ on the gripping plane perpendicular to the axis of a frictional cone of each of the finger mechanisms 11 to 13 in the object w on the basis of the outputs of the six-axis force sensor and the like arranged in each of the finger mechanisms 11 to 13 (FIG. 3/S006). Here, the frictional cone is defined as a cone in which a contact point of each of the finger mechanisms 11 to 13 and the object w is set to a vertex and a normal vector of each of the finger mechanisms 11 to 13 at this contact point is set to an axis.

Respective z-components $f_{10z}(k)$, $f_{20z}(k)$ and $f_{30z}(k)$ of target application forces $F_{10}(k)={}^t(f_{10y}(k),f_{10z}(k))$ $F_{20}={}^t(f_{20y}(k),f_{20z}(k))$ and $F_{30}={}^t(f_{30y}(k),f_{30z}(k))$ from the respective finger mechanisms 11 to 13 to the object w are temporarily set by formulas (1a) to (1c) (FIG. 3/S008). Formulas (1a) to (1c) show that the sum of the respective z-components of the target application forces $F_{10}(k)$ to $F_{30}(k)$ becomes zero.

$$f_{10z}(k)=-(1/\alpha(k))f_0,$$

$$(0<\alpha(k)\leq 1,\alpha(k-1)<\alpha(k)) \quad (1a)$$

$$f_{20z}(k)=f_0 \quad (1b)$$

$$f_{30z}(k)=\{(1-\alpha(k))/\alpha(k)\}f_0 \quad (1c)$$

Here, $f_0$ is an appropriate constant.

Further, target application forces $F_{10}(k)$ to $F_{30}(k)$ are set so as to satisfy a "stable gripping condition". In the stable gripping condition, as shown by formula (2a), the sum of respective y-components of target application forces $F_{10}(k)$ to $F_{30}(k)$ becomes zero. Further, as shown by formula (2b), the sum of respective z-components of target application forces $F_{10}(k)$ to $F_{30}(k)$ becomes zero. Further, as shown by formula (3), the sum of moments applied to the object w becomes zero. Further, a slip index s1 defined in formula (4) becomes minimum. Namely, the stable gripping condition is the condition of forming the equality of formula (5).

$$f_{10y}(k)+f_{20y}(k)+f_{30y}(k)=0 \quad (2a)$$

$$f_{10z}(k)+f_{20z}(k)+f_{30z}(k)=0 \quad (2b)$$

$$\begin{aligned}M_{10}(k)+M_{20}(k)+M_{30}(k)=& \\ (c_1(k)xF_{10}(k))+(c_2(k)xF_{20}(k))+(c_3(k)xF_{30}(k))=& \\ (c_{1y}(k)f_{10z}(k)-c_{1z}(k)f_{10z}(k)-c_{1z}(k)f_{10y}(k))+& \\ (c_{2y}(k)f_{20z}(k)-c_{2z}(k)f_{20y}(k))+& \\ (c_{3y}(k)f_{30z}(k)-c_{3z}(k)f_{30y}(k))=0& \end{aligned} \quad (3)$$

-continued $$s1(k) \equiv |t_1(k) \cdot F_{10}(k)|^2 + |t_2(k) \cdot F_{20}(k)|^2 + |t_3(k) \cdot F_{30}(k)|^2 = \quad (4)$$
$$(t_{1y}(k)f_{10y}(k) + t_{1z}(k)f_{10z}(k))^2 +$$
$$(t_{2y}(k)f_{20y}(k) + t_{2z}(k)f_{20z}(k))^2 + (t_{3y}(k)f_{30y}(k) + t_{3z}(k)f_{30z}(k))^2 =$$
$$(t_{1y}(k)f_{10y}(k) - (1/a(k))t_{1z}(k)f_0)^2 + (t_{2y}(k)f_{20y}(k) + t_{2z}(k)f_0)^2 +$$
$$(t_{3y}(k)f_{30y}(k) + \{(1 - a(k))/a(k)\}t_{3z}(k)f_0)^2$$

$$(\partial/\partial f_0)s1(k) = 0 \quad (5)$$

With respect to the slip index $s1(k)$, the weighting of right side first and second terms on relative to frictional force of each of the first finger mechanism 11 and the second finger mechanism 12 and the object w may be also set to be larger than the weighting of a right side third term relative to frictional force of the third finger mechanism 13 separated from the object w and the object w, and this right side third term may be also omitted.

The respective y-components of target application forces $F_{10}(k)$ to $F_{30}(k)$ are calculated so as to be represented by formulas (6a) to (6c) by means of formulas (1a) to (1c) and (2) to (5)(FIG. 3/S010).

$$f_{10y}(k) = (B(k)f_L(k) - A(k))/C(k) \quad (6a)$$

$$f_{20y}(k) = f_L(k) \quad (6b)$$

$$f_{30y}(k) = \{-(B(k) + C(k))f_L(k) + A(k)\}/C(k) \quad (6c)$$

Here, A, B, C and $f_1$ are represented by the following formulas (7a) to (7d).

$$A(k) \equiv \{-(1/a(k))c_{1y}(k) + c_{2y}(k) + \{(1 - a(k))/a(k)\}c_{3y}(k)\}f_0 \quad (7a)$$

$$B(k) \equiv c_{3z}(k) - c_{2z}(k) \quad (7b)$$

$$C(k) \equiv c_{1z}(k) - c_{3z}(k) \quad (7c)$$

$$f_L(k) \equiv -E(k)/D(k) \quad (7d)$$
$$D(k) \equiv (B(k)t_{1y}(k)/C(k))^2 + t_{2y}(k)^2 + \{(B(k) + B(k))t_{3y}(k)/C(k)\}^2$$
$$E(k) \equiv -(B(k)/C(k)) \cdot (A(k)t_{1y}(k)/C(k) + t_{1z}(k)f_0/a(k))t_{1y}(k) +$$
$$n_{2y}(k)t_{2z}(k)f_0 - \{A(k)t_{3y}(k)/C(k) + (1 - a(k))t_{3z}(k)f_0/a(k)\} \cdot$$
$$\{(B(k) + C(k))/C(k)\}t_{3y}(k)$$

Subsequently, a correction coefficient $\beta(k)$ represented by formula (8) is calculated such that a maximum value $F_{max}(k)$ ($=\max(|F_{10}(k)|, |F_{20}(k)|)$ of target maximum forces $|F_{10}(k)|$ and $|F_{20}(k)|$ to the object from each of the first finger mechanism 11 and the second finger mechanism 12 different from the third finger mechanism 13 separated from the object w among target application forces $F_{10}(k)$ to $F_{30}(k)$ temporarily set is conformed to its upper limit value $F_{ltd}$.

$$\beta(k) = F_{ltd}/F_{max}(k) \quad (8)$$

Target application forces $F_{10}(k)$ to $F_{30}(k)$ temporarily set are corrected by multiplying this correction coefficient $\beta(k)$ so that target application forces $F_{10}(k)$ to $F_{30}(k)$ are finally set as shown by formulas (9a) to (9c) (FIG. 3/S012).

$$F_{10}(k) = \beta(k)^t((B(k)f_L(k) - A(k))/C(k),$$
$$-(1/\alpha(k))f_0) \quad (9a)$$

$$F_{20}(k) = \beta(k)^t(f_L(k), f_0(k)) \quad (9b)$$

$$F_{30}(k) = \beta(k)^t(\{-(B(k) + C(k))f_L(k) + A(k)\}/C(k),$$
$$\{(1 - \alpha(k))/\alpha(k)\}f_0) \quad (9c)$$

The operation of the motor arranged in each of joints 111, 113, 115, 121, 123, 125, 131, 133 and 135 is controlled such that forces $F_1(k)$ to $F_3(k)$ applied from each of the finger mechanisms 11 to 13 to the object w are conformed to target application forces $F_{10}(k)$ to $F_{30}(k)$. Thus, the operation of each of the first finger mechanism 11, the second finger mechanism 12 and the third finger mechanism 13 is controlled (FIG. 3/S014).

Figure 6:
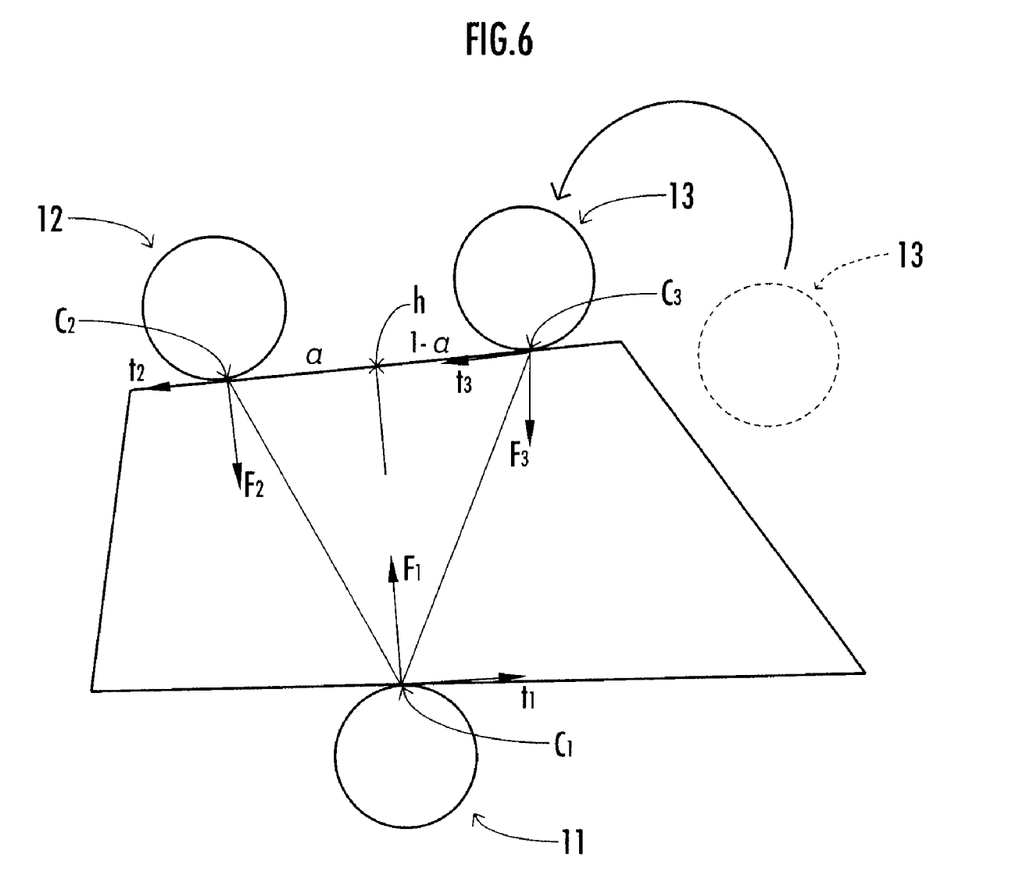
FIG. 6 is a view illustrating the function of the robot hand of the present invention.

Thereafter, on the basis of the outputs of the six-axis force sensor and the like arranged in each of the finger mechanisms 11 to 13, it is judged by the control unit 2 whether the changing of the manner of holding the object w is terminated or not (FIG. 3/016). For example, it is judged whether the changing of the manner of holding the object w is terminated or not according to whether or not the third finger mechanism 13 is separated from the object w as shown in FIG. 5 and is then again abutted on the object w as shown in FIG. 6, and an abutting position of each of the finger mechanisms 11 to 13 onto the object w is conformed to an object position.

When a judging result is denial (FIG. 3/S016—NO), the index k is increased by 1 (FIG. 3/S018) and the above processing is again executed (see FIG. 3/S004 to S016). On the other hand, when the judging result is affirmative (FIG. 3/S016—YES), the processing of the changing of the holding manner is terminated.

In accordance with the robot hand 1 fulfilling the above function, when force $F_3$ applied to the object w from the third finger mechanism 13 among the plurality of finger mechanisms 11 to 13 is changed, the operation of each of the finger mechanisms 11 to 13 is controlled such that contacts $c_1$, $c_2$, $c_3$ of the respective finger mechanisms 11 to 13 in the object w, and target application forces $F_{10}(k)$, $F_{20}(k)$, $F_{30}(k)$ from the respective finger mechanisms 11 to 13 to the object w, in its turn, application forces $F_1$, $F_2$, $F_3$ satisfy the "stable gripping condition" (see FIG. 3/S002 to S014). The "stable gripping condition" is a condition in which (1) the sum of each of forces and moments applied from the plurality of finger mechanisms 11 to 13 to the object w becomes zero (see formulas (1) to (3)), and (2) the slip index s1 becomes minimum (see formulas (4) and (5)). Since the condition of setting forces $F_1$, $F_2$, $F_3$ and moments $M_1$, $M_2$, $M_3$ applied from the plurality of finger mechanisms 11 to 13 to the object w to zero is satisfied, the situation of greatly changing the position and posture of the object w with respect to the robot hand 1 is avoided. Further, since the condition of minimizing the slip index s1 is satisfied, the situation of slipping the finger mechanisms 11 to 13 with respect to the object w is avoided or restrained.

Accordingly, in a process in which force applied to the object w from the third finger mechanism 13 among the plurality of finger mechanisms 11 to 13 is gradually weakened and becomes zero and the certain finger mechanism is separated from the object, a balance of the force applied from the plurality of finger mechanisms 11 to 13 to the object w can be appropriately adjusted from the view point of object gripping. Further, in a process in which the third finger mechanism 13 separated from the object w as shown in FIG. 5 is again abutted on the object w as shown in FIG. 6 and the force applied from the third finger mechanism 13 to the object w is gradually strengthened, the balance of the force applied from the plurality of finger mechanisms 11 to 13 to the object w can be appropriately adjusted from the view point of the object gripping. The changing of the manner of holding the object w involving the separation of the certain finger mechanism from the object w and the reabutting onto the object w as mentioned above can be smoothly executed.

Further, the operations of the finger mechanisms 11 to 13 are controlled such that a maximum value $F_{max}(k)$ (=max $(|F_{10}(k)|,|F_{20}(k)|)$ of target application forces $|F_{10}(k)|$ and $|F_{20}(k)|$ to the object w from each of the first finger mechanism 11 and the second finger mechanism 12 different from the third finger mechanism 13 separated from the object w is conformed to its upper limit value $F_{ltd}$.

Thus, one of application forces $F_1(k)$ and $F_2(k)$ to the object w from each of the first finger mechanism 11 and the second finger mechanism 12 continuously abutting on the object w in changing the manner of holding the object w is adjusted to its upper limit value. Thus, frictional force of the finger mechanisms and the object is strengthened and it can be prevented or restrained that the finger mechanisms are slipped with respect to the object.

In the above embodiment, application force $F_3$ from the third finger mechanism 13 to the object w is gradually weakened from a state in which the object w is gripped by the first finger mechanism 11, the second finger mechanism 12 and the third finger mechanism 13 (see FIG. 4). The third finger mechanism 13 is then separated from the object w (see FIG. 5). Thereafter, the third finger mechanism 13 is again abutted on the object w. Thus, the manner of holding the object w is changed. However, the manner of holding the object w may be also changed by the robot hand 1 in various modes different from the above embodiment. For example, when the robot hand 1 has an unillustrated fourth finger mechanism, the manner of holding the object w may be also changed by abutting the fourth finger mechanism on the object w instead of the third finger mechanism 13 separated from the object w. Further, the manner of holding the object w may be also changed by separating the second finger mechanism 12 from the object w from a gripping state of the object w using the finger mechanisms 11 to 13 (see FIG. 4), and again abutting the second finger mechanism 12 on the object w.

What is claimed is:

1. A robot hand, comprising:
   a base portion;
   a plurality of finger mechanisms extended from the base portion and able to be bent and stretched;
   a first measuring section for measuring a contact point with each finger mechanism on an object;
   a second measuring section for measuring a force vector applied from each finger mechanism to the object; and
   a control section for controlling an operation of each finger mechanism on the basis of a measuring result of each of the first measuring section and the second measuring section;
   wherein said control section controls the operation of each finger mechanism such that the contact point with each finger mechanism on the object measured by the first measuring section and the force vector applied to the object from each finger mechanism measured by the second measuring section satisfy a stable gripping condition in a process for changing the force vector applied to the object from at least one of certain finger mechanisms among the plurality of finger mechanisms; and
   said stable gripping condition is a condition in which a sum of each of forces and moments applied from said plurality of finger mechanisms to said object becomes zero, and a slip index becomes minimum as a decreasing function of the magnitude of an inner product of a vector perpendicular to an axis of a frictional cone of said object with respect to each finger mechanism and an application force vector from each finger mechanism to the object becomes minimum.

2. The robot hand according to claim 1, wherein the robot hand further comprises a first finger mechanism, and second and third finger mechanisms abutting on said object oppositely to the first finger mechanism as said plurality of finger mechanisms, contacts on the object of each of the first, second and third finger mechanisms being defined as a first contact, a second contact and a third contact, respectively; and
   said control section controls the operation of each finger mechanism such that a ratio of the force applied to the object from each of the first, second and third finger mechanisms with respect to a direction perpendicular to a line segment connecting the second and third contacts in a plane including the first, second and third contacts in the process for changing the force vector applied from the third finger mechanism to the object is represented as $-1:\alpha:1-\alpha(0 \leq \alpha < 1)$ by using a coefficient $\alpha$ determined so as to satisfy said stable gripping condition.

3. The robot hand according to claim 1, wherein said control section controls the operation of each finger mechanism such that the force applied to said object from at least one finger mechanism except for said certain finger mechanism, in which the force of this certain finger mechanism applied to said object is weakened, among said plurality of finger mechanisms reaches an upper limit value.

4. A legged mobile robot comprising, a base body; a plurality of leg bodies extended from the base body; an arm extended from an upper portion of the base body; a robot hand attached to a tip of the arm; and a control section for controlling a gripping operation of an object using the robot hand and operations of the plurality of leg bodies;
   said robot hand, comprising:
   a base portion;
   a plurality of finger mechanisms extended from the base portion and able to be bent and stretched;
   a first measuring section for measuring a contact point with each finger mechanism on said object; and
   a second measuring section for measuring a force vector applied from each finger mechanism to the object;
   wherein said control section controls the operation of each finger mechanism such that the contact point with each finger mechanism on the object measured by the first measuring section and the force vector applied to the object from each finger mechanism measured by the second measuring section satisfy a stable gripping condition in a process for changing the force vector applied to the object from at least one of certain finger mechanisms among the plurality of finger mechanisms; and
   said stable gripping condition is a condition in which the sum of each of forces and moments applied from said plurality of finger mechanisms to said object becomes zero, and a slip index becomes minimum as a decreasing function of a magnitude of an inner product of a vector perpendicular to an axis of a frictional cone of said object with respect to each finger mechanism and an application force vector from each finger mechanism to the object.

* * * * *

UNITED STATES PATENT AND TRADEMARK OFFICE
CERTIFICATE OF CORRECTION

PATENT NO. : 7,787,993 B2
APPLICATION NO. : 11/928603
DATED : August 31, 2010
INVENTOR(S) : Takahashi It is certified that error appears in the above-identified patent and that said Letters Patent is hereby corrected as shown below:

Title Page 2, in Field (56), under "OTHER PUBLICATIONS", in Column 1, Lines 2-3, delete "ro Power Grasp"," and insert -- to Power Grasp", --

Title Page 2, in Field (56), under "OTHER PUBLICATIONS", in Column 1, Line 6, delete "C 43," and insert -- Vol. 43, --

Title Page 2, in Field (56), under "OTHER PUBLICATIONS", in Column 1, Line 9, delete "Com." and insert -- Conf. --

Title Page 2, in Field (56), under "OTHER PUBLICATIONS", in Column 1, Line 12, delete "Dextrous Manipulation", Proc. 2000 IEEE Int. Com." and insert -- Dexterous Manipulation", Proc. 2000 IEEE Int. Conf. --

Title Page 2, in Field (56), under "OTHER PUBLICATIONS", in Column 2, Line 2, delete "Com." and insert -- Conf. --

Title Page 2, in Field (56), under "OTHER PUBLICATIONS", in Column 2, Line 5, delete "Dextrous" and insert -- Dexterous --

Title Page 2, in Field (56), under "OTHER PUBLICATIONS", in Column 2, Line 6, delete "Com." and insert -- Conf. --

Title Page 2, in Field (56), under "OTHER PUBLICATIONS", in Column 2, Line 10, delete "HAnd" and insert -- Hand --

Signed and Sealed this
First Day of February, 2011

David J. Kappos
*Director of the United States Patent and Trademark Office*